Dec. 5, 1939.   W. F. SMITH   2,182,455
FLEXIBLE COUPLING
Filed Oct. 28, 1937   3 Sheets-Sheet 1

INVENTOR
W. F. Smith
BY
ATTORNEY

Dec. 5, 1939.                    W. F. SMITH                    2,182,455
                              FLEXIBLE COUPLING
                           Filed Oct. 28, 1937            3 Sheets-Sheet 2

INVENTOR
W. F. Smith
BY
ATTORNEY

Dec. 5, 1939.  W. F. SMITH  2,182,455
FLEXIBLE COUPLING
Filed Oct. 28, 1937  3 Sheets-Sheet 3

INVENTOR
W. F. Smith
BY
ATTORNEY

Patented Dec. 5, 1939

2,182,455

UNITED STATES PATENT OFFICE 2,182,455

FLEXIBLE COUPLING

William F. Smith, Brooklyn, N. Y.

Application October 28, 1937, Serial No. 171,448

4 Claims. (Cl. 64—7)

This invention relates to new and useful improvements in flexible couplings, such as universal joints, which are used to transmit rotary motion between two shafts whose axes are misaligned.

In prior flexible couplings, where it was desired to transmit motion between an inner and an outer member through the agency of balls, the coacting surfaces of the two members, including the ball pockets, were all ground to a common radius. Thus the rotation of the inner member within the outer member was assured but at a very great cost, because it was expensive to grind ball-engaging surfaces of the outer member to a true radius, and even a slight inaccuracy resulted in an unequal distribution of the load on the various balls.

In order to reduce the cost of such flexible couplings without affecting their efficiency, in accordance with the present invention the ball-engaging surfaces in one of the members, the inner member, is ground to a radius formed from a point beyond the center of the structure, whereby the ball-engaging surfaces of the other member, the outer member, may be bored straight. The point from which the radius is formed to which the inner member is ground is determined depending on the size of the structure and particularly the size of the balls, so that irrespective of the relative displacements of the two members, there be continuous contact between the balls and the two members.

Fig. 1 is a longitudinal section, in the operating position, of a preferred form of construction for high angle operation; Fig. 2 is a transverse section in normal alignment of the embodiment shown in Fig. 1. Figs. 3 and 4 are similar views of a modification of the device shown in Figs. 1 and 2, Fig. 3 being a section along lines 8—8 of Fig. 4.

Figure 1:
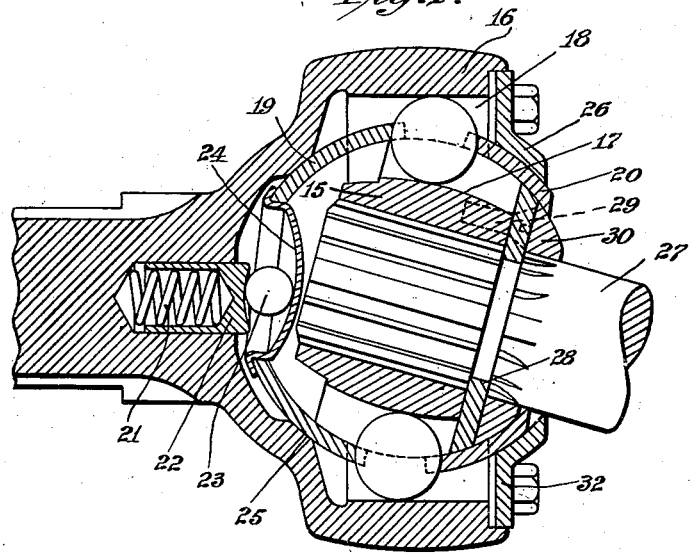

The coupling consists of an inner ring 15 provided with a plurality of ball grooves and having a perimeter formed to a true radius from the common center of motion and engaging with a radius formed in an outer ring 16. The essential difference in the ball grooves in inner ring 15 from the ball grooves in the inner ring of the usual structures is in the longitudinal radius of the grooves as indicated at 17. In order to compensate for the increasing clearance that results from ball grooves 18 in outer ring 16 being bored parallel to the axis and tangent to the radius of motion of the inner ring 15, this radius is struck from a point beyond the center of motion.

The radius 17 is so proportioned as to maintain close and uniform contact between the ball grooves of the inner and outer members in any position within the designed angle of operation. The importance of this lies in that it simplifies the construction of the grooves in the outer ring 16. Heretofore it has been the practice to form the radius of the grooves in both the inner and outer rings from a common center which involved difficult and expensive operations and construction. In my construction the motion of the balls is reduced for a given angle of motion or deflection of the inner ring, as compared to structures in which the grooves of the inner and outer rings are formed to a radius from a common center.

The point from which the radius is struck will differ for devices of varying dimensions. The important point is to compensate for the increasing distance between the top of the groove in the outer member 16 and surface 17 as the ball rolls from the neutral position.

If the ball is rolled between a fixed or movable surface, the ball center will travel approximately one-half the distance travelled by the movable surface. Owing to the curvature of 17 and the changing position of contact with the balls as the inner member is rotated, the motion of the ball is reduced for a given motion of the inner member approximately in the ratio of 2 to 5 instead of one-half. This is desirable from an operating standpoint, since it reduces the ball velocities and wear.

The balls are retained in position by retainers 19 and 20, which are designed to maintain contact with and control the relative positions of the balls through the agency of a spring 21 which constantly presses a plunger 22 against a steel ball 23. The steel ball is pressed against a cupped washer 24 inserted in the retainer 19.

The inside radius which is struck from the common center is formed so as to clear the radius of the inner ring 15 and it is centered on the balls. The inner ring engages surfaces 25 provided in the outer ring 16.

The pressure of spring 21 is transferred through the balls to the other retainer 20, which is supported by a flange ring 26 secured to the outer ring 16 by cap screws. The contact formed by the ball 23 between the cupped surface of plunger 22 and washer 24 is designed to build up an increasing pressure in opposition to the motion of the ball retainers 19 and 20 to counteract the inertia of the balls and retainers and thereby reduce the slip in reversing the motion of the balls, particularly at high speeds.

As compared with prior structures, my retainers are relatively inexpensive and simple in construction. They are also easy to assemble and since they are not interposed between the inner and outer members the ball grooves can be made to the full depth equal to one-half the ball diameter. The increased depth of the ball grooves permits a greater contact area between ball and groove and materially increases the load capacity of the devices.

The retainers also form part of the seal in Fig. 1. Since the retainer moves at approximately one-half the speed of the inner member and in the same direction, the rubbing velocity and consequent wear is reduced.

Figure 5:
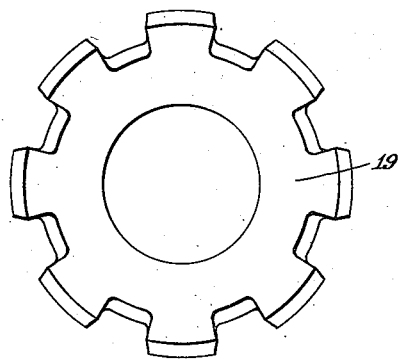
Figs. 5 and 6 illustrate the form of ball retainer used in the construction shown in Figs. 1 and 3, being front and side elevations, respectively, of said retainer.
Figure 6:
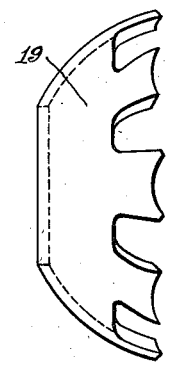

As shown in Figs. 5 and 6, the retainers 19 are dished and have projecting cupped fingers, one for each ball.

The inner ring 15 is fitted to a splined shaft 27 and is secured against endwise motion by a split collar 28 engaging a groove in the shaft. The two halves of the collar 28 are attached to the inner ring 15 by means of screws such as 29. A collar 30 is formed around the shaft 27 to a radius conforming to the inside radius of retainer 20, thus constituting a seal.

32 is a gasket to seal the joint between the outer ring 16 and the flanged ring 26, and to provide for adjustment of the clearance between outer ring 16 and ring 26.

In order to assure uniform load distribution between all the balls and to compensate for inaccuracies in the forming of the ball grooves in the inner and outer rings, slots 31 are cut between adjacent grooves in the inner ring 15. This will permit a degree of resilient deflection of the ball grooves under conditions of heavy or suddenly applied loads. Furthermore, these slots facilitate lubrication of the contacting surfaces between the inner and outer members.

It will be clear from the above that the inner ring 15 can be assembled from punched laminations held together by suitable means such as rivets between heavy end plates. This facilitates manufacture and provides for added resiliency.

Figure 2:
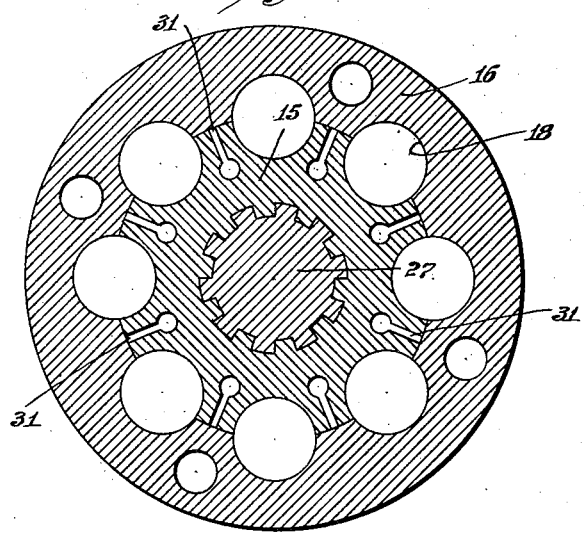
Figure 3:
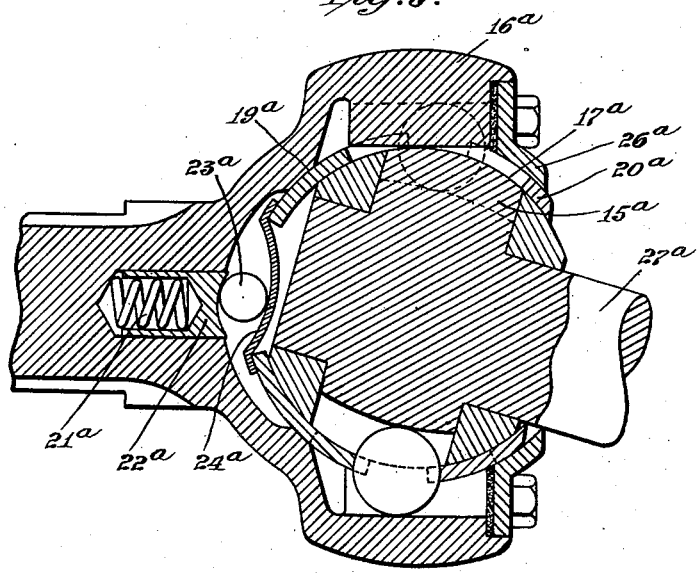
Figure 4:
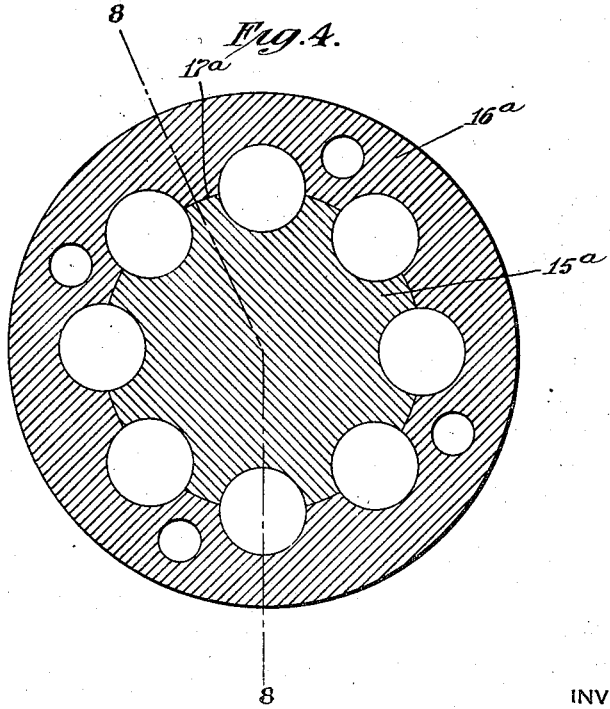

A modification of Figs. 1 and 2 is illustrated in Figs. 3 and 4. The difference between the two constructions is that the inner grooved member 15ª is formed integral with the shaft 27ª. This eliminates the splines and means for locating the inner member on the shaft. It also reduces the machining of the outer member bore and eliminates the grinding of the interlocking radius on the inner and outer members, since the inner member would be centered as shown with a clearance otherwise between the two members. This construction also provides a greater projected area to resist wear under pressure from axial thrust.

The details of the construction will be clear from what was said about the previous figure.

Figure 7:
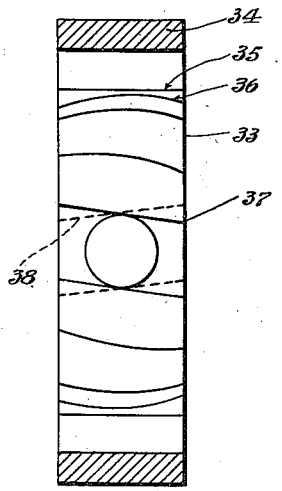
Fig. 7 is a side view, partly in section, and Fig. 8 an end view of a modified construction in which the ball grooves form a spiral helix with respect to the axis of the shaft. This construction may be used in conjunction with any of the structures disclosed.
Figure 8:
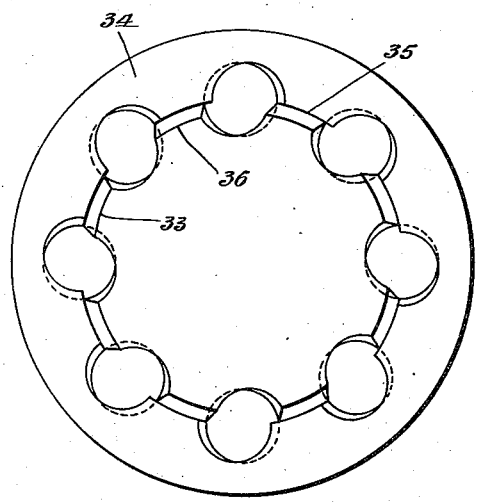

Figs. 7 and 8 illustrate a special arrangement of the ball grooves which, as previously stated, is applicable to all the embodiments disclosed. The inner ring is indicated at 33 and the outer ring at 34. These are provided with a plurality of grooves which instead of being parallel with the axis of the device, are arranged to form a spiral helix. The grooves in each ring have reversed spiral angles with respect to one another, such as right- and left-hand. 35 indicates a straight bore in the outer ring, 36 the inner ring 33 centered in the outer ring, 37 a right-hand helix on the inner ring 33, and 38 a left-hand helix on the outer ring.

The combined angles or the sum of the two groove angles of the inner and outer rings 33 and 34 must be less than will force the balls endwise under a thrust when torque is transmitted, but the combined angles should be greater than the maximum angle of operation.

The thrust is neutralized between the two members, owing to the diametrically opposite formation of the grooves on each member forming opposing angles with respect to the axis.

The main object of this construction is definitely to maintain the position or center of the balls in the grooves, and to prevent lateral movement of the balls except under the influence of the angular motion of one member. This arrangement insures this, although no retainers or other devices are provided, because the position of the balls is controlled by the intersection of the groove angles of the inner and outer members.

Another advantage of this construction is that a curvature is automatically generated in the grooves with respect to their central axes which permits greater angular motion between the two members than where straight circular grooves are provided.

The perimeter of the inner member 33 is formed to a radius struck from its own center and may be interlocked with a conforming radius in the outer ring 34 to prevent endwise motion, or the outer ring 34 may be bored straight and allow lateral motion of the inner ring to form a slip joint.

What I claim is:

1. In a flexible coupling, cooperating inner and outer members having their contacting surfaces grooved to form a plurality of ball pockets, the bottoms of the ball engaging surfaces of the grooves in the inner member being formed in an axial direction on a radius struck from a point beyond the center of motion of the inner member, and the bottoms of the ball engaging surface of the grooves in the outer member being parallel to its axis.

2. In a universal joint, cooperating inner and outer members substantially circular in cross-section and having their contacting surfaces grooved to form a plurality of ball pockets when the members are assembled, the bottoms of the ball engaging surfaces of the grooves in the inner member being formed in an axial direction on a radius struck from a point beyond the center of motion of the inner member, and the bottoms of the ball engaging surfaces of the grooves in the outer member being parallel to the axis, two annular ball retainers opposite one another, means for rigidly holding in place one retainer, and spring-pressed means for holding in place the other retainer.

3. In a universal joint, cooperating inner and outer members, a shaft fastened to each member, said members being substantially circular in cross-section and having their contacting surfaces grooved to form a plurality of ball pockets when the members are assembled, the bottoms of the ball engaging surfaces of the grooves in the inner member being formed in an axial direction on a radius struck from a point beyond the center of motion of the inner member, and the bottoms of the ball engaging surfaces of the grooves in the outer member being parallel to the axis, the inter-groove portions of the inner member having radial slots, the perimeter of the two members in engagement being formed on a radius from the common center of motion, two annular cup shaped ball retainers, ball engaging fingers opposite one another, said ball retainers being outside of the ball pockets, a flange mounted on the outer and a flange mounted on the inner member holding one retainer in place, said flanges as well as said retainers being formed on a radius struck from the common center of motion of the device, a cup in the opening of the other retainer, a ball in said cup, a spring-pressed plunger in the outer member engaging the last mentioned ball.

4. In a flexible coupling, an inner and an outer member, each provided with grooves which when the members are assembled form ball pockets, the ball engaging surfaces of the grooves in the inner member being formed on a radius, and those of the outer member being straight in an axial direction, and spring-pressed ball retainers outside of said pockets.

WILLIAM F. SMITH.